(12) United States Patent
Grattan

(10) Patent No.: US 11,407,449 B2
(45) Date of Patent: Aug. 9, 2022

(54) ENERGY ABSORBING STRUCTURE FOR VEHICLE FRAME

(71) Applicant: Nissan North America, Inc., Franklin, TN (US)

(72) Inventor: Patrick Grattan, Wixom, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 172 days.

(21) Appl. No.: 16/799,005

(22) Filed: Feb. 24, 2020

(65) Prior Publication Data

US 2021/0261193 A1 Aug. 26, 2021

(51) Int. Cl.
| | |
|---|---|
| *B62D 21/15* | (2006.01) |
| *B62D 21/03* | (2006.01) |
| *B62D 27/04* | (2006.01) |
| *B62D 27/02* | (2006.01) |
| *B62D 21/08* | (2006.01) |

(52) U.S. Cl.
CPC ............. *B62D 21/15* (2013.01); *B62D 21/03* (2013.01); *B62D 21/08* (2013.01); *B62D 27/02* (2013.01); *B62D 27/04* (2013.01)

(58) Field of Classification Search
CPC ........ B62D 21/15; B62D 21/03; B62D 21/08; B62D 27/02; B62D 27/04
See application file for complete search history.

(56) References Cited

U.S. PATENT DOCUMENTS

| | | | |
|---|---|---|---|
| 4,225,167 A | 9/1980 | Buettner et al. | |
| 6,604,884 B1 | 8/2003 | Ohkura | |
| 6,813,818 B2 | 11/2004 | Schmidt | |
| 7,137,658 B2 | 11/2006 | Haneda et al. | |
| 7,819,218 B2 * | 10/2010 | Eichberger | B62D 21/152 180/274 |
| 7,900,983 B2 | 3/2011 | Saitou | |
| 8,398,153 B1 | 3/2013 | Dandekar et al. | |
| 8,398,154 B1 * | 3/2013 | Nusier | B62D 21/152 296/187.1 |
| 8,590,950 B2 | 11/2013 | Hermanson et al. | |
| 8,764,096 B2 | 7/2014 | Han et al. | |
| 8,870,267 B2 | 10/2014 | Zischke et al. | |
| 8,985,258 B1 | 3/2015 | Midoun et al. | |

(Continued)

FOREIGN PATENT DOCUMENTS

| | | |
|---|---|---|
| DE | 102013003911 A1 | 9/2014 |
| EP | 2487055 A1 | 8/2012 |
| WO | 03-051654 A1 | 6/2003 |

*Primary Examiner* — Lori L Lyjak
(74) *Attorney, Agent, or Firm* — Global IP Counselors, LLP

(57) ABSTRACT

A vehicle frame includes a first structural member and an energy absorbing structure connected to the first structural member. The first structural member extends in a vehicle longitudinal direction. An energy absorbing structure is connected to the first structural member. The energy absorbing structure includes a first fixed member, an impact member and a connecting member. The first fixed member is connected to the first structural member. The impact member is connected to the first structural member. A connecting member is movably connected to the first fixed member and has a first end fixed to the impact member such that movement of the impact member moves the connecting member about the first fixed member.

18 Claims, 8 Drawing Sheets

(56) References Cited

U.S. PATENT DOCUMENTS

| | | |
|---|---|---|
| 8,985,671 B1 | 3/2015 | Lei et al. |
| 9,056,634 B2 | 6/2015 | Watanabe |
| 9,061,713 B2 | 6/2015 | Hashimoto et al. |
| 9,067,549 B2 | 6/2015 | Baccouche et al. |
| 9,079,619 B2 | 7/2015 | Gupta et al. |
| 9,180,913 B2 | 11/2015 | Ameloot et al. |
| 9,180,915 B2 | 11/2015 | Kim |
| 9,193,318 B2 | 11/2015 | Barbat et al. |
| 9,211,915 B2 | 12/2015 | Abe et al. |
| 9,233,716 B2 | 1/2016 | Midoun et al. |
| 9,266,485 B2 | 2/2016 | Kuriyama et al. |
| 9,272,678 B2 | 3/2016 | Nam et al. |
| 9,272,679 B1 | 3/2016 | Ramoutar et al. |
| 9,290,138 B2 | 3/2016 | Muraji et al. |
| 9,394,003 B2 | 7/2016 | Matsumoto et al. |
| 9,415,805 B2 | 8/2016 | Fujikawa et al. |
| 9,421,927 B2 | 8/2016 | Basappa et al. |
| 9,676,416 B2 | 6/2017 | Kitakata et al. |
| 9,771,106 B2 | 9/2017 | Ogawa et al. |
| 9,855,971 B2 | 1/2018 | Daido et al. |
| 9,908,564 B1 | 3/2018 | Grattan |
| 2008/0023954 A1 | 1/2008 | Eichberger et al. |
| 2009/0302591 A1 | 12/2009 | Auer et al. |
| 2012/0248820 A1* | 10/2012 | Yasui ............... B60R 19/34 296/187.09 |
| 2015/0021935 A1 | 1/2015 | Baccouche et al. |
| 2015/0298742 A1 | 10/2015 | Ono et al. |
| 2015/0336525 A1 | 11/2015 | Nam et al. |
| 2015/0360633 A1 | 12/2015 | Nishida et al. |
| 2018/0065669 A1 | 3/2018 | Ghislieri et al. |
| 2018/0194399 A1 | 7/2018 | Grattan |
| 2018/0194400 A1 | 7/2018 | Grattan |
| 2018/0194401 A1 | 7/2018 | Grattan |
| 2018/0194402 A1 | 7/2018 | Grattan |
| 2019/0329824 A1 | 10/2019 | Grattan |

* cited by examiner

ENERGY ABSORBING STRUCTURE FOR VEHICLE FRAME

BACKGROUND

Field of the Invention

The present invention generally relates to a vehicle frame. More specifically, the present invention relates to an energy absorbing structure for a vehicle frame.

Background Information

Vehicle structures often include structural features that absorb impact forces generated during an impact event.

SUMMARY

One object of the disclosure is to provide a vehicle frame that absorbs energy during an off-center impact event.

In view of the state of the known technology, one aspect of the present invention is to provide a vehicle frame including a first structural member and an energy absorbing structure connected to the first structural member. The first structural member extends in a vehicle longitudinal direction. An energy absorbing structure is connected to the first structural member. The energy absorbing structure includes a first fixed member, an impact member and a connecting member. The first fixed member is connected to the first structural member. The impact member is connected to the first structural member. A connecting member is movably connected to the first fixed member and has a first end fixed to the impact member such that movement of the impact member moves the connecting member about the first fixed member.

Another aspect of the present invention is to provide a vehicle frame including a structural member and an energy absorbing structure connected to the structural member. The structural member extends in a vehicle longitudinal direction. The structural member has a window. An energy absorbing structure is connected to the structural member. The energy absorbing structure includes a fixed member, an impact member and a connecting member. The fixed member is disposed in the structural member. The impact member is connected to the structural member and extends from an outboard side of the structural member. The connecting member is movably connected to the fixed member and has a first end passing through the window and fixed to the impact member such that movement of the impact member moves the connecting member about the fixed member.

Also other objects, features, aspects and advantages of the disclosed energy absorbing structure for a vehicle frame will become apparent to those skilled in the art from the following detailed description, which, taken in conjunction with the annexed drawings, discloses exemplary embodiments of the energy absorbing structure for a vehicle frame.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
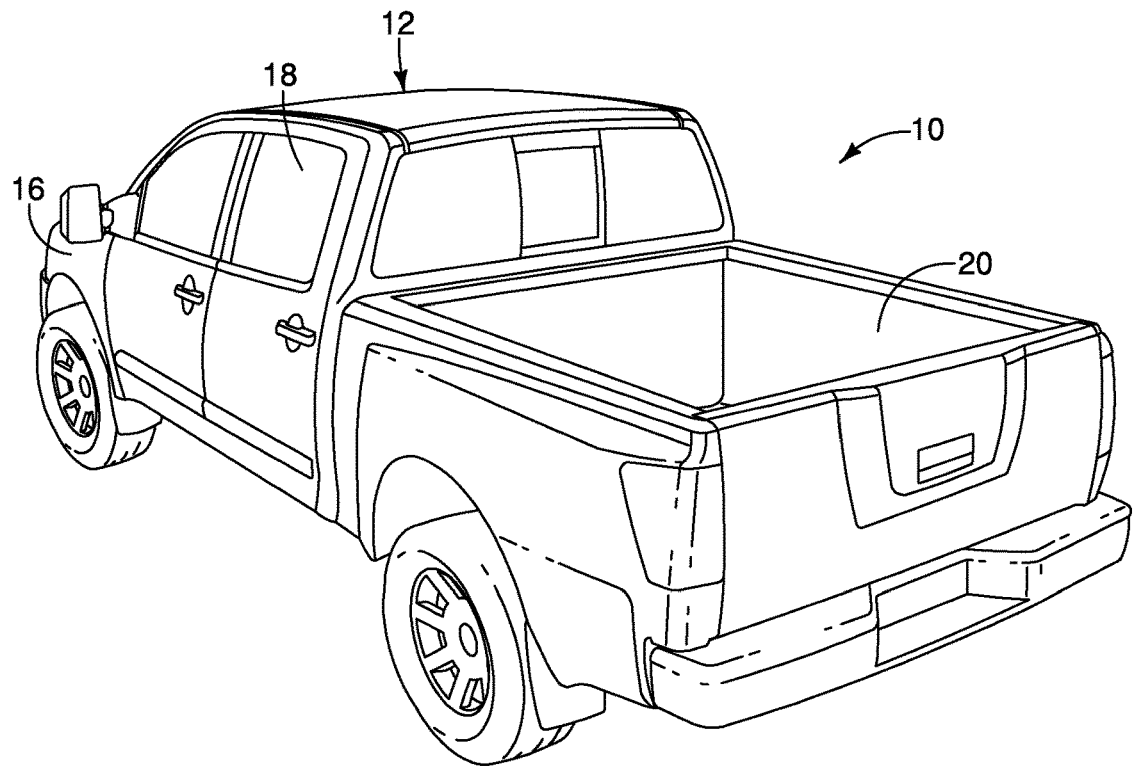
FIG. 1 is a perspective view of a vehicle including an energy absorbing structure in accordance with an exemplary embodiment of the present invention.
Figure 2:
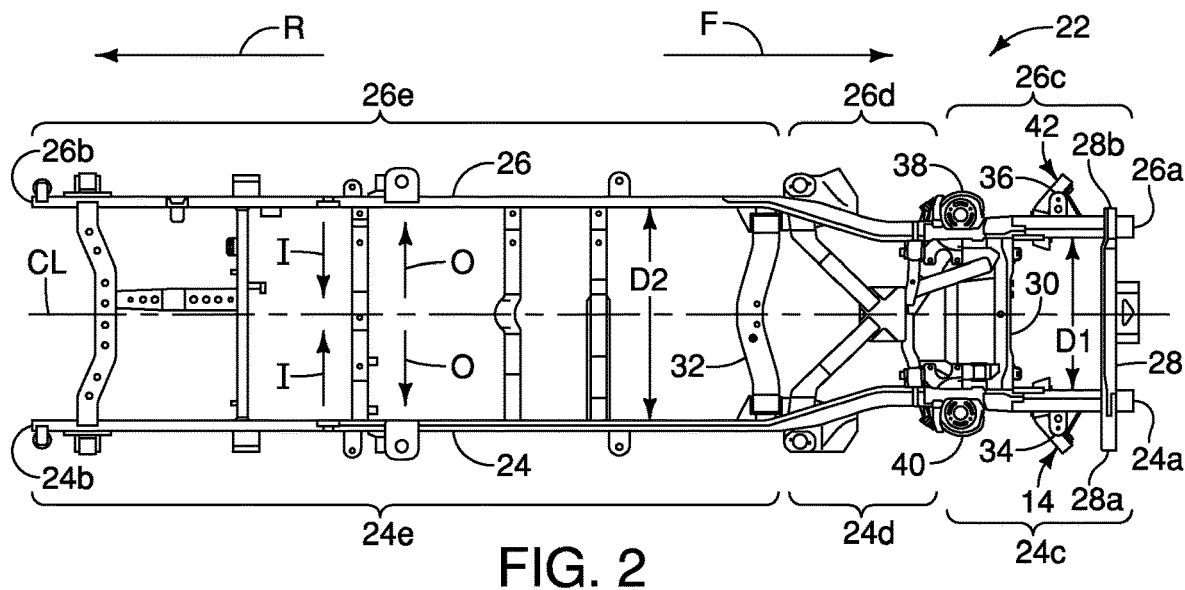
FIG. 2 is a top plan view of a frame of the vehicle of FIG. 1 illustrating an energy absorbing structure attached to each of the longitudinally extending frame side-members.

Referring initially to FIGS. 1 and 2, a vehicle 10 with a vehicle body structure 12 that includes an energy absorbing structure 14 (FIG. 2), is illustrated in accordance with an exemplary embodiment of the present invention.

In FIG. 1, the vehicle 10 is depicted as a pickup truck that includes the vehicle body structure 12 and defines, for example, an engine compartment 16, a passenger compartment 18 and a cargo area 20. The vehicle body structure 12 is installed to and rests on a frame 22 (FIG. 2). The frame 22 and/or portions thereof are shown removed from the vehicle 10 in FIGS. 2-12. Specifically, FIG. 2 shows the frame 22 with a pair of the energy absorbing structures 14 and 42 installed thereto. The energy absorbing structures 14 and 42 are disposed on opposite sides of the frame 22. FIGS. 3-12 illustrate only a front area of one side of the frame 22 with the energy absorbing structure 14 attached thereto.

In FIG. 1, the depicted pickup truck that defines the vehicle 10 is a heavy-duty vehicle intended to haul large and/or heavy materials. The frame 22 is therefore a rigid, strong structure able to withstand heavy duty usage. However, it should be understood from the drawings and the description herein, that the frame 22 and the energy absorbing structures 14 described below can be configured for smaller vehicles or larger vehicles and are not limited to usage with a heavy-duty vehicle, such as the vehicle 10.

In other words, the energy absorbing structure 14 can be used on any size vehicle that includes a frame, such as the frame 22, where the vehicle body structure 12 attaches to and is supported by the frame 22. It should also be understood from the drawings and description, that the energy absorbing structure 14 can also be employed with a unibody vehicle. A unibody vehicle is a vehicle that does not typically include a separate frame, such as the frame 22. Rather, the unibody vehicle includes various structural elements welded together. Elements of the unibody vehicle serve as frame elements functionally equivalent to the elements of the frame 22. For example, U.S. Pat. No. 8,870,267, assigned to Nissan North America, discloses a unibody vehicle body structure. The front structural support portions 30 disclosed in U.S. Pat. No. 8,870,267 are basically vehicle side-members, such as those of the frame 22 (described in greater detail below). U.S. Pat. No. 9,180,913, also assigned to Nissan North America, also discloses a unibody vehicle body structure and further discloses an engine cradle. The elements of the energy absorbing structure 14 can be installed to portions of the unibody vehicle disclosed in U.S. Pat. No. 8,870,267 and portions of the engine cradle of U.S. Pat. No. 8,870,267. Both U.S. Pat. Nos. 8,870,267 and 9,180,913 are incorporated herein by reference in their entirety. Because unibody vehicles are conventional structures, further description thereof is omitted for the sake of brevity.

In FIG. 2, several directions relative to the frame 22 (and the vehicle 10) are shown to define orientations of the various features of the vehicle 10 and the energy absorbing structure 14. Specifically, the vehicle 10 and the frame 22 define a longitudinal center line CL that extends in a lengthwise direction of the vehicle 10 along a central portion of the vehicle 10. A forward direction F and a rearward direction R relative to the frame 22 are indicated by the depicted arrows in FIG. 2. Inboard directions I and outboard directions O relative to the longitudinal center line CL are also shown in FIG. 2.

As shown in FIG. 2, the frame 22 includes a first side-member 24 (i.e., a first structural member), a second side-member 26, and a first cross-member 28 (i.e., a second structural member). The second structural member 28 is the most forward cross-member. The frame 22 can include additional cross-members disposed rearward of the first cross-member 28 that extend between the first and second side-members 24 and 26, such as a second cross-member 30 and a third cross-member 32. The second cross-member 30 is disposed rearward of the first cross-member 28, and the third cross-member 32 is disposed rearward of the second cross-member 30. The frame 22 is made of heavy gauge steel, but can alternatively be made of other materials depending upon the overall design of the vehicle 10. It should therefore be understood that the first side-member 24 extends along and under a passenger's side of the vehicle 10, and the second side-member 26 extends along and under a driver's side of the vehicle 10.

The first side-member 24 is an elongated beam (also referred to as a structural member) that has multiple contours and shapes. The first side-member 24 extends in a vehicle longitudinal direction. Specifically, the first side-member 24 has a front end 24a and a rear end 24b. The first side-member 24 also has a first portion 24c, a second portion 24d and a third portion 24e. The first portion 24c extends in the rearward direction R from the front end 24a to a location proximate where the first side-member 24 bends outwardly. The first portion 24c is generally straight. The second portion 24d has a curved shape such that just rearward of the first portion 24c, the second portion 24d gradually curves in the outboard direction O. The third portion 24e is generally straight, but can include contours and curves, depending upon the overall design of the vehicle 10.

Similarly, the second side-member 26 is an elongated beam that has multiple contours and shapes that are symmetrical to the first side-member 24. The second side-member 26 extends in the vehicle longitudinal direction. Specifically, the second side-member 26 has a front end 26a and a rear end 26b. The second side-member 26 also has a first portion 26c, a second portion 26d and a third portion 26e. The first portion 26c extends in the rearward direction R from the front end 26a to a location proximate where the second side-member 26 bends outwardly. The first portion 26c is generally straight. The second portion 26d has a curved shape such that just rearward of the first portion 26c, the second portion 26d gradually curves in the outboard direction O. The third portion 26e is generally straight, but can include contours and curves, depending upon the overall design of the vehicle 10.

The first portions 24c and 26c of the first and second side-members 24 and 26 are a first distance D1 away from one another, and the third portions 24e and 26e are a second distance D2 away from one another, as shown in FIG. 2. The second distance D2 is greater than the first distance D1.

Figure 3:
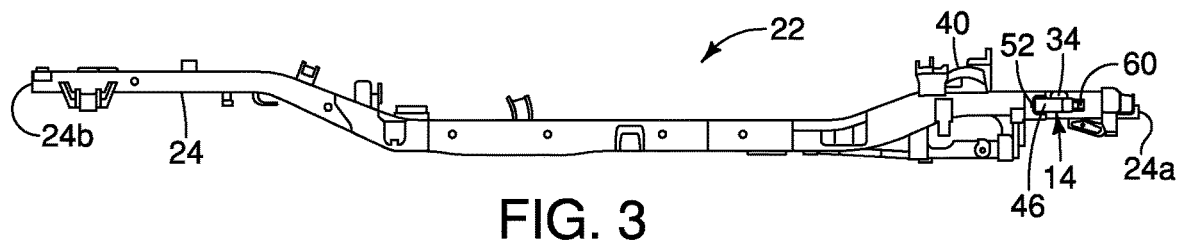
FIG. 3 is a side elevational view of the vehicle frame of FIG. 2.

The first and second side-members 24 and 26 each include body attachment structures 34 and 36 (also referred to as body mounts or attachment flanges). The body attachment structures 34 and 36 are welded to the first and second side-members 24 and 26 and are dimensioned and shaped to attach to the vehicle body structure 12 of the vehicle 10. The body attachment structures 34 and 36 extend from outboard sides of the first portions 24c and 26c of the first and second side-members 24 and 26 rearward of the first cross-member 30. The body attachment structures 34 and 36 are disposed between the first cross-member 28 and the second cross-member 30. The third portions 24e and 36e of the first and second side-members 24 and 26 can also include additional body attachment structures configured for attachment to structures that define the cargo area 20 of the vehicle 10. Further, the third portions 24e and 26e can have portions at the same level above the ground as the first portions 24c and 26c, portions lower than the first portions 24c and 26 relative to ground, and/or portions at a level higher that the first portions 24c and 26c relative to the ground, as shown in FIG. 3. The second portions 24d and 26d can include a downward curvature relative to the ground in a rearward direction of the vehicle.

As shown in FIG. 2, each of the first portions 24c and 26c of the first and second side-members 24 and 26 further include front suspension structures, such as coil spring supports 38 and 40. The coil spring supports 38 and 40 are rigidly fixed, such as by welding, to respective ones of the first and second side-members 24 and 26. The coil spring supports 38 and 40 are dimensioned and shaped to support lower ends of front suspension coil springs in a conventional manner. Because front suspension coil springs are conventional structures, further description is omitted for the sake of brevity.

The engine compartment 16 of the vehicle body structure 12 is approximately located in the space above and between the first portions 24c and 26c of the first and second side-members 24 and 26. A front portion of the passenger compartment 18 is located in the space above and between the second portions 24d and 26d of the first and second side-members 24 and 26 rearward of the engine compartment 16. The remainder of the passenger compartment 18 and the cargo area 20 of the vehicle body structure 12 are located above the third portions 24 and 26 of the first and second side-members 24 and 26.

The first cross-member 28 is welded or otherwise rigidly fixed proximate the front ends 24a and 26a of the first and second side-members 24 and 26. The first cross-member 28 extends in a vehicle lateral direction. A bumper structure (not shown) can be attached to the first cross-member 28. The first cross-member 28 is connected to the first side-member 24 at or adjacent to the front end 24a of the first side-member 24. The first cross-member 28 includes a first outboard portion 28a that extends from the first side-member 24 in the outboard direction O. The first cross-member 28 includes a second outboard portion 28b that extends from the second side-member 26 in the outboard direction O.

Figure 4:
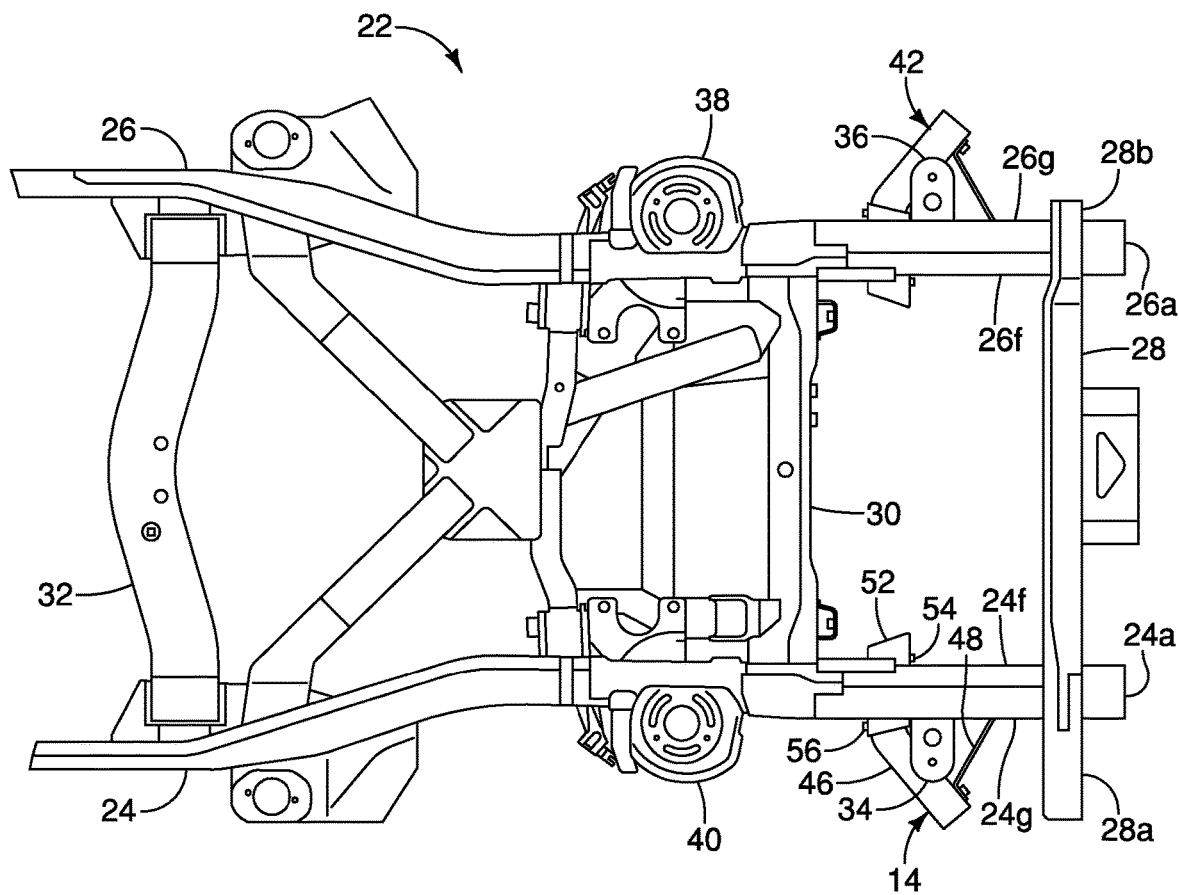
FIG. 4 is an enlarged top plan view of the energy absorbing structure of FIG. 2.
Figure 6:
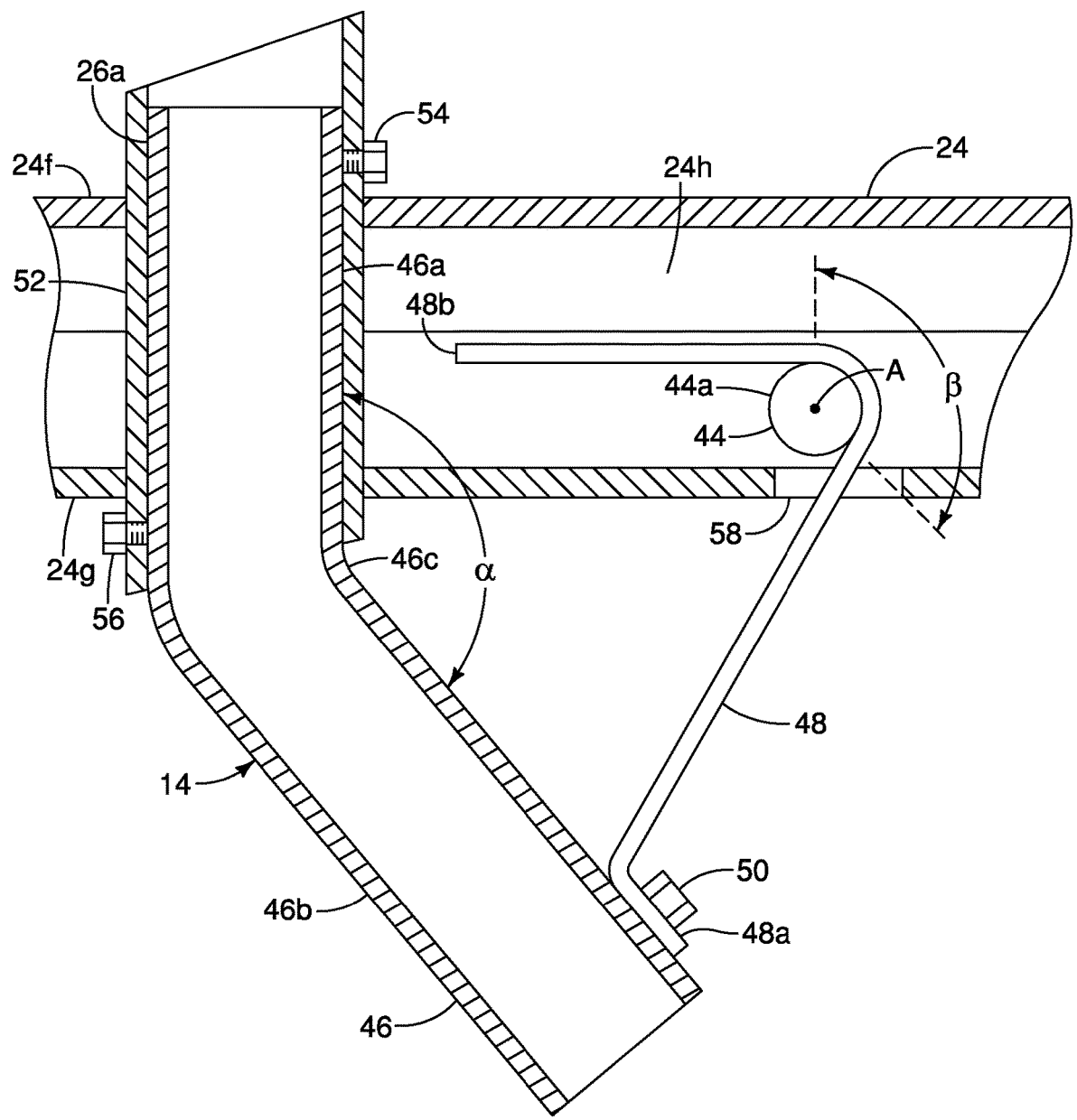
FIG. 6 is a top plan view in cross-section of the vehicle frame of FIG. 4.

As shown in FIGS. 4 and 6, at least a portion of each of the first and second side-members 24 and 26 are formed by two frame halves 24f and 24g and 26f and 26g, respectively. The frame halves 24f and 24g define a hollow portion 24h in the first structural member 24, as shown in FIG. 6. A similar hollow portion is formed in the second side member 26 by the frame halves 26f and 26g. As shown in FIG. 6, the hollow portions are formed in at least the first portions 24c and 26c of the first and second side-members 24 and 26, although any suitable length of the first and second side-members 24 and 26 can be hollow.

The energy absorbing structure 14 is connected to the first side-member 24, as shown in FIGS. 2-6. A second energy absorbing structure 42 is connected to the second side-member 26, as shown in FIG. 2, and is substantially identical to the first energy absorbing structure 14. The second energy absorbing structure 42 is disposed on an outboard side of the second side-member 26 at approximately the same longitudinal position as the first energy absorbing structure 14. In other words, the second energy absorbing structure 42 is disposed approximately a same distance rearward of the front end 26a of the second side-member 26 as the first energy absorbing structure 14 is disposed rearward of the front end 24a of the first side-member 24. Although the following description refers to the first energy absorbing structure 14, the description applies equally to the second energy absorbing structure 42.

The energy absorbing structure 14 includes a first fixed member 44, an impact member 46, and a connecting member 48, as shown in FIG. 6. The first fixed member 44 is connected to the first structural member 24. The impact member 46 is connected to the first structural member 24. The connecting member 48 is movably connected to the first fixed member 44 and has a first end 48a fixed to the impact member 46 such that movement of the impact member 46 moves the connecting member 48 about the first fixed member 44.

Figure 5:
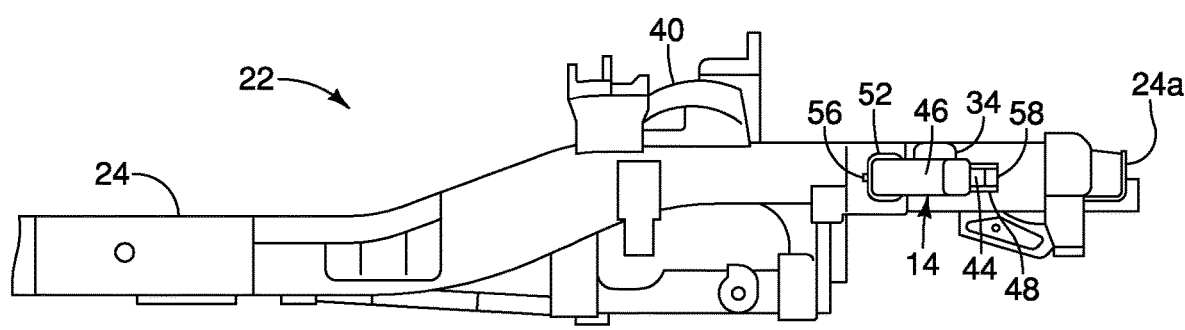
FIG. 5 is an enlarged side plan view of the energy absorbing structure of FIG. 4.

The first fixed member 44 is disposed in the hollow portion 24h of the first structural member 24, as shown in FIGS. 5 and 6. As shown in FIG. 6, the first fixed member 44 is a spool having a substantially circular cross section when viewed in a direction parallel to a longitudinal axis A of the spool. The first fixed member 44 can be any suitable member that is rigidly fixed to the first structural member 24 such that the first fixed member 44 does not move relative to the first structural member 24. The first fixed member 44 can be connected to the first structural member 24 in any suitable manner, such as by welding. An upper end of the first fixed member 44 can be welded to an upper, inner surface of the first structural member 24 and a lower end of the first fixed member 44 can be welded to a lower, inner surface of the first structural member 24, thereby rigidly fixing the first fixed member 44 to the first structural member 24. Alternatively, the first fixed member 44 can be integrally formed with the first structural member 24 as a one-piece member. The first fixed member 44 has an outer surface 44a. The first fixed member 44 is preferably made of steel, but can be any suitable material.

The impact member 46 is connected to the first structural member, as shown in FIGS. 4 and 6. The impact member 46 has a first portion 46a and a second portion 46b. The second portion 46b of the impact member 46 extends from an outboard side of the first structural member 24. The second portion 46b is disposed at an angle α with respect to the first portion 46a. Preferably, the angle α is between 120 and 150 degrees, but is preferably approximately 135 degrees. A bent portion 46c of the impact member 46 is disposed between the first and second portions 46a and 46b. The impact member 46 is disposed rearwardly of the second structural member 28, as shown in FIG. 2. The impact member 46 is preferably made of the same material as the first structural member 24, although the impact member 46 can be made of any suitable material. As shown in FIG. 6, the impact member 46 is preferably hollow, although the impact member 46 can be a solid member. The impact member 46 is preferably integrally formed as a one-piece member.

The connecting member 48 has the first end 44a and a second end 48b, as shown in FIG. 6. The first end 48a of the connecting member 48 is fixed to the impact member 46. The first end 48a can be fixed to the impact member 46 in any suitable manner, such as with a fastener 50. The second end 48b of the connecting member 48 is preferably free to allow for movement of the connecting member about the first fixed member 44. In other words, the second end 48b of the connecting member is preferably not directly connected to structure to allow for movement of the connecting member 48. Alternatively, the second end 48b of the connecting member 48 can be connected to the first structural member 24 with a frangible member, such as a frangible bolt, that breaks upon sufficient force being exerted on the frangible member, such as during an impact to the impact member 46, to allow movement of the connecting member 48. The frangible member secures the second end 48b of the connecting member 48 to substantially prevent noise generated by movement of the second end of the connecting member 48.

Figure 9:
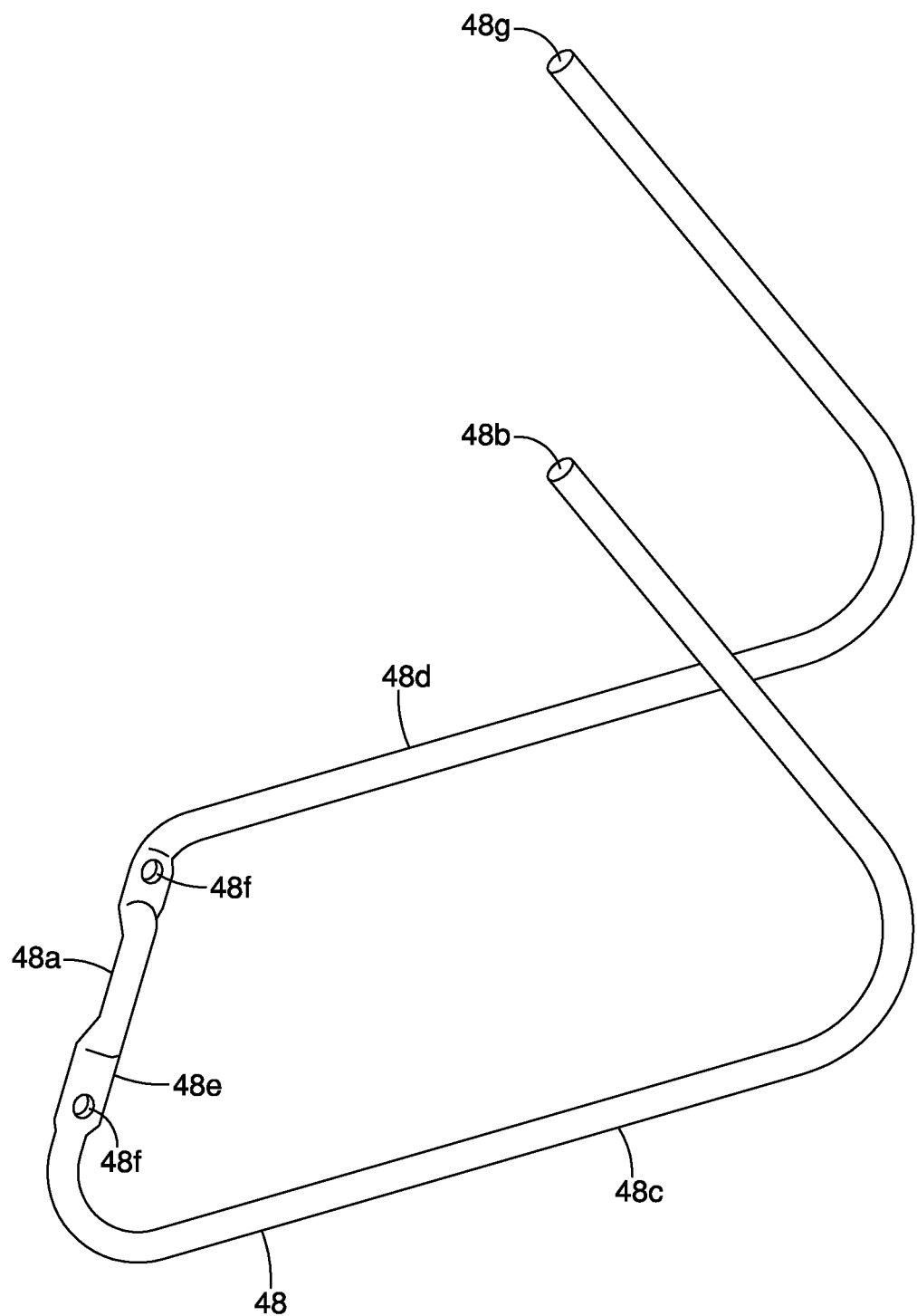
FIG. 9 is a perspective view of a connecting member of the energy absorbing structure of FIG. 6.

As shown in FIG. 9, the connecting member 48 preferably has a first portion 48c and a second portion 48d connected by a connecting portion 48e. The first and second portions 48c and 48d are substantially V-shaped. The connecting portion 48e has a plurality of fastener openings 48f that receive the fasteners 50 to secure the connecting member 48 to the impact member 46. The second ends 48b and 48g of the first and second portions 48c and 48d, respectively, are free ends. The opposite ends of the first and second portions 48c and 48d are connected to the connecting portion 48e to define the first end 48a of the connecting member 48. Preferably, the connecting member 48 is integrally formed as a one-piece member. The connecting member 48 is preferably made of a spring steel, although any suitable material can be used.

A sleeve 52 is connected to the first structural member 24, as shown in FIGS. 2-6. The sleeve 52 can be connected to the first structural member 24 in any suitable manner, such as by welding. The sleeve 52 can be welded at an inboard portion to the frame half 24f and welded at an outboard portion to the frame half 24g. The sleeve 52 receives the pipe member 46. A first fastener 54 secures the impact member 46 to the sleeve 52 on an inboard side of the first structural member 24. A second fastener 56 secures the impact member 46 to the first structural member 24 on an outboard side of the first structural member 24, as shown in FIG. 6. The first and second fasteners 54 and 56 are preferably self-tapping fasteners, although the impact member 46 can be connected to the sleeve 52 in any suitable manner.

An alternative configuration of the impact member is shown in FIGS. 7, 8, 10 and 12. The impact member 46 has a third portion 46d connected to an end of the second portion 46b. The third portion 46d is substantially parallel to the first portion 46a. The second portion 46b is angularly disposed between the first and third portions 46a and 46d. The third portion 46d extends substantially perpendicularly to the first structural member 24, and provides an increased surface area disposed perpendicular the longitudinal direction of the first structural member 24. The configuration of the impact member 46 shown in FIGS. 7, 8, 10 and 12 omits the sleeve 52, such that the impact member is directly connected to the first structural member 24. The impact member 46 passes through an opening in the first structural member 24. The impact member 46 is connected to the first structural member 24 on an inboard portion and an outboard portion thereof in any suitable manner, such as by welding or through a hinged connection. In other words, the impact member 46 is welded or hingedly connected to the frame half 24f and to the frame half 24g.

As shown in FIG. 6, the energy absorbing structure 14 is connected to the first structural member 24. The impact member 46 is connected to the first structural member rearward of the first fixed member 44. A window, or opening, 58 is disposed in the first structural member 24 to allow the connecting member 48 to pass therethrough. The window 58 is disposed in the frame half 24g on the outboard side of the first structural member 24. The first fixed member 44 is preferably disposed adjacent to and inboard of the window 58. The second, or free, end 48b of the connecting member 48 is disposed rearward of the first fixed member 44 and within the first structural member 24. The connecting member 48 contacts an outer surface 44a of the first fixed member 44 and extends out from the first structural member 24 through the window 58. The first end 48a of the connecting member 48 is connected to the impact member 48. The first end 48a of the connecting member 48 extends from the window 58 and is connected to the second portion 46b of the impact member 46 with a fastener 50.

The connecting member 48 contacts the outer surface 44a of the first fixed member 44 and passes out through the window 58 in the first structural member 24 such that the first end 48a of the connecting member 48 can be connected to the impact member 46. A contact angle β is formed between the connecting member 48 and the first fixed member 44, as shown in FIG. 6. The contact angle β is preferably less than 180 degrees. As shown in FIG. 6, the contact angle β is approximately 135 degrees. Passing the connecting member 48 around the first fixed member 44 provides a bend in the connecting member 48. The first end 48a of the connecting member 48 is connected to the impact member 46, such that movement of the impact member 46 moves the connecting member 48. The first fixed member 44 guides the movement of the connecting member 48 responsive to movement of the impact member 48.

Figure 7:
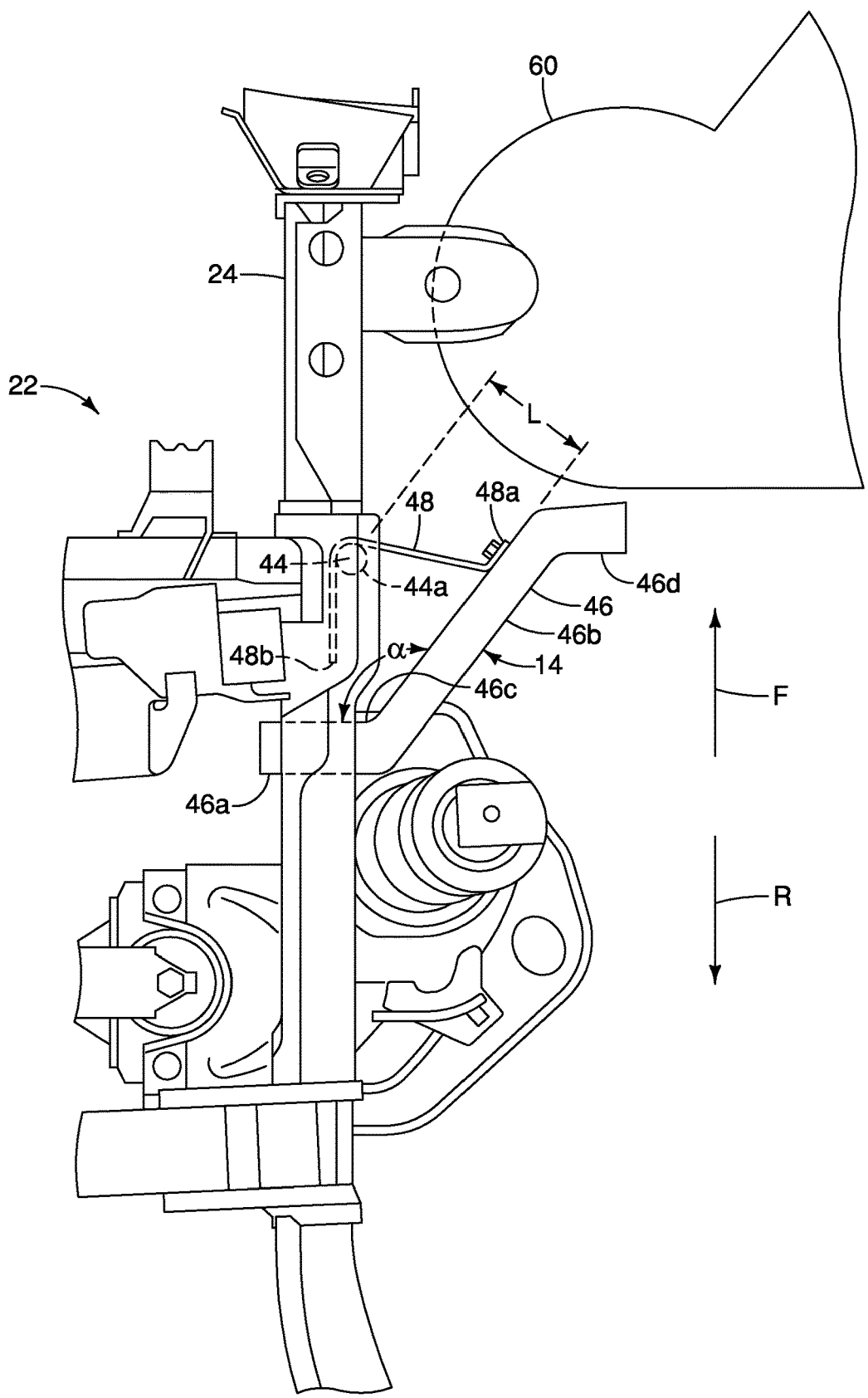
FIG. 7 is an enlarged top plan view of the energy absorbing structure of FIG. 2 prior to contact with a barrier.
Figure 8:
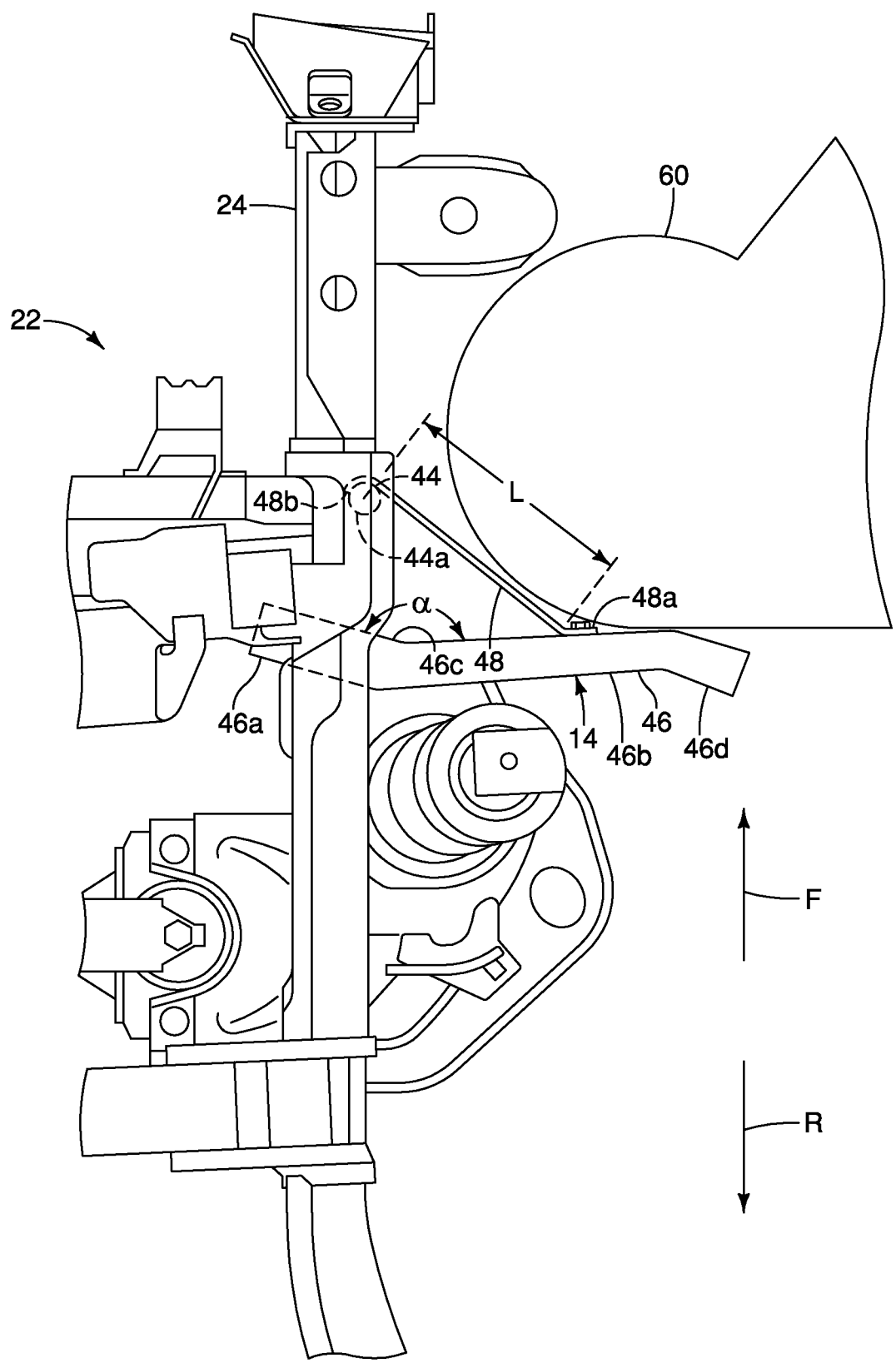
FIG. 8 is an enlarged top plan view of the energy absorbing structure of FIG. 7 during contact with a barrier.

In response to an impact event of a small overlap impact test, the third portion 46d, or an outboard portion, of the impact member 46 is impacted by a barrier 60, as shown in FIGS. 7 and 8. The impact of the barrier 60 with the impact member 46 deforms the impact member in the rearward direction R. When the impact member 46 moves rearwardly, the connecting member 48 moves relative to and about the first fixing member 44 due to the first end 48a of the connecting member 48 being rigidly fixed to the impact member 46. The second end 48b of the connecting member 48 being free allows for movement of the connecting member 48 due to movement of the impact member 46. Alternatively, when the second end 48b of the connecting member is connected to the first structural member 24 by a frangible member, the movement of the connecting member 48 due to movement of the impact member 48 applies sufficient force to separate the frangible member and allow for movement of the connecting member 48.

The rearward movement of the impact member 46 bends the impact member 46 about the bent portion 46c of the impact member, as shown in FIG. 8. In other words, the angle β increases, as the impact member 46 is pivoted in the clockwise direction, as shown in FIGS. 7 and 8. This pivotal movement of the impact member 46 causes the connecting member 48 to move about the first fixed member 44, thereby moving the second end 48b of the connecting member 48 in the forward direction F. The length L of the connecting member 48 between a last point of contact with the first fixing member 44 and a first point of contact with the impact member 46 increases with rearward deformation of the impact member 46. As the angle β increases with deformation of the impact member 46, the length L of the connecting member 46 increases. The connecting member 48 is substantially straight over the length L. The lengthening of the connecting member 48 allows the impact member 48 to absorb the impact energy of the barrier 60. The connecting member 48 allows the impact member 48 to bend to a greater degree before rupturing than in the absence of the connecting member. The connecting member 48 provides a deflection of the impact member 46 about the bent portion 46c of up to approximately 180 degrees. The first structural member 24 of the frame 22 can deform to further accommodate deflection of the impact member 46, as shown in FIG. 8.

The deformation of a structure is limited by its ultimate tensile strength, thereby limiting the amount of energy absorption of the structure before rupturing. The energy absorbing structure 14, as shown in FIGS. 1-9, allows for larger deformation of the impact member 46, thereby providing for a greater amount of energy absorption by the impact member 46. The connecting member 48 is initially in a bent configuration, as shown in FIGS. 6 and 7. When the impact member 46 deforms, or pivots in the clockwise direction, as shown in FIG. 8, the connecting member 48 pays out from the first fixed member 44, and is straightened, thereby providing energy absorption to the energy absorbing structure 14. The size of the material used to make the connecting member 48 can be selected based on the desired amount of deformation of the impact member 46. The larger the size of the connecting member 48, such as a larger diameter of the bar stock from which the connecting member 48 is made, allows for greater deformation of the impact member 46.

Figure 10:
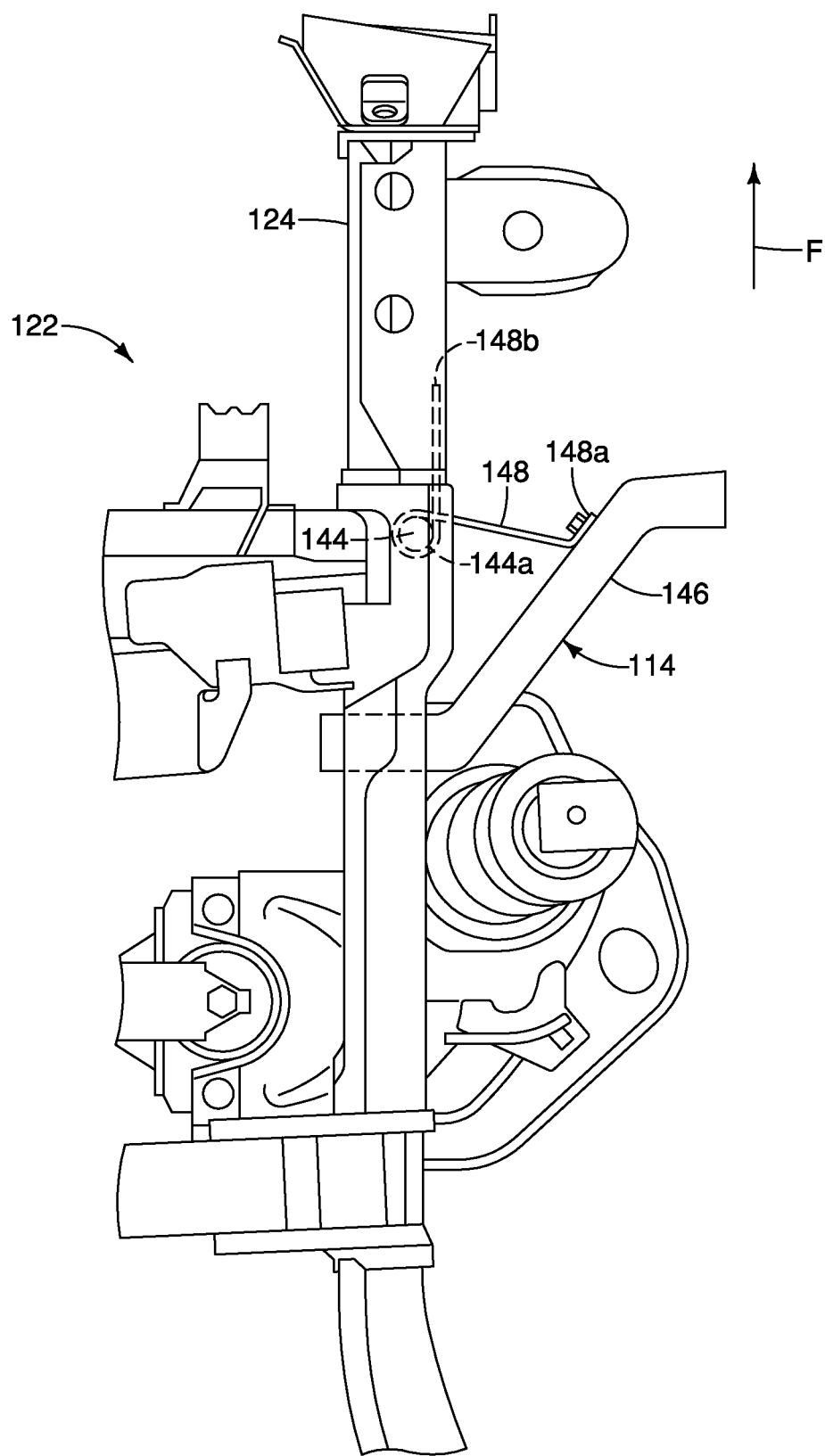
FIG. 10 is an enlarged top plan view of an energy absorbing structure in accordance with another exemplary embodiment of the present invention.

As shown in FIG. 10, a vehicle frame 122 in accordance with another illustrated exemplary embodiment of the present invention is substantially similar to the vehicle frame 22 of the exemplary embodiment illustrated in FIGS. 1 to 9 except for the differences described below. Similar parts are identified with similar reference numerals, except increased by 100 (i.e., 1xx, accordingly).

The connecting member 148 of the energy absorbing structure 114 has a contact angle with the outer surface 144a of the first fixed member 144 of approximately 360 degrees. The second end 148b of the connecting member 148 is disposed forward of the first fixing member 144 and forward of the impact member 146. The second end 148b of the connecting member 148 is disposed within the first structural member 124.

By providing a longer path for the connecting member 148 prior to being straightened between the first fixed member 144 and the impact member 146, a larger amount of energy can be absorbed by the energy absorbing structure 114. A longer path is provided by the configuration shown in FIG. 10 by providing a contact angle of approximately 360 degrees with the first fixed member 144.

Figure 11:
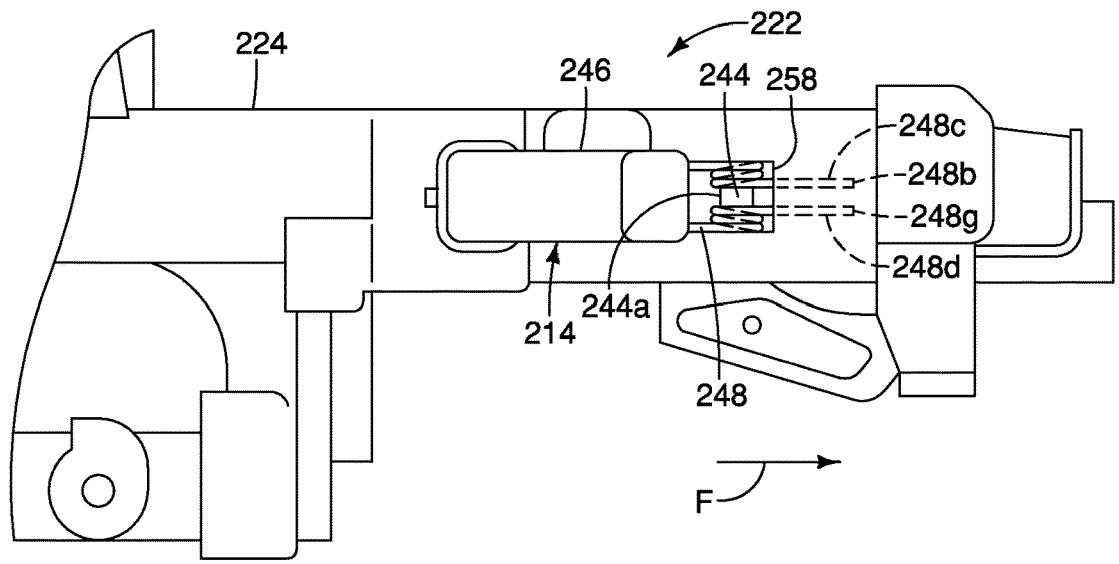
FIG. 11 is a side elevational view of the energy absorbing structure of FIG. 10.

As shown in FIG. 11, a vehicle frame 222 in accordance with another illustrated exemplary embodiment of the present invention is substantially similar to the vehicle frame 22 of the exemplary embodiment illustrated in FIGS. 1 to 9 except for the differences described below. Similar parts are identified with similar reference numerals, except increased by 200 (i.e., 2xx, accordingly).

The connecting member 248 of the energy absorbing structure 214 has a contact angle with the outer surface 244a of the first fixed member 244 of approximately 720 degrees. In other words, the connecting member 248 makes approximately two complete revolutions around the first fixed member 244.

The second ends 248b and 248g of the portions 248c and 248d of the connecting member 248 are disposed forward of the first fixing member 144, forward of the impact member 246, and forward of the window 258. The second ends 248b and 248g of the connecting member 248 are disposed within the first structural member 124.

By providing a longer path for the connecting member 248 prior to being straightened between the first fixed member 244 and the impact member 246, a larger amount of energy can be absorbed by the energy absorbing structure 214. A longer path is provided by the configuration shown in FIG. 11 by providing a contact angle of approximately 720 degrees with the first fixed member 244.

Figure 12:
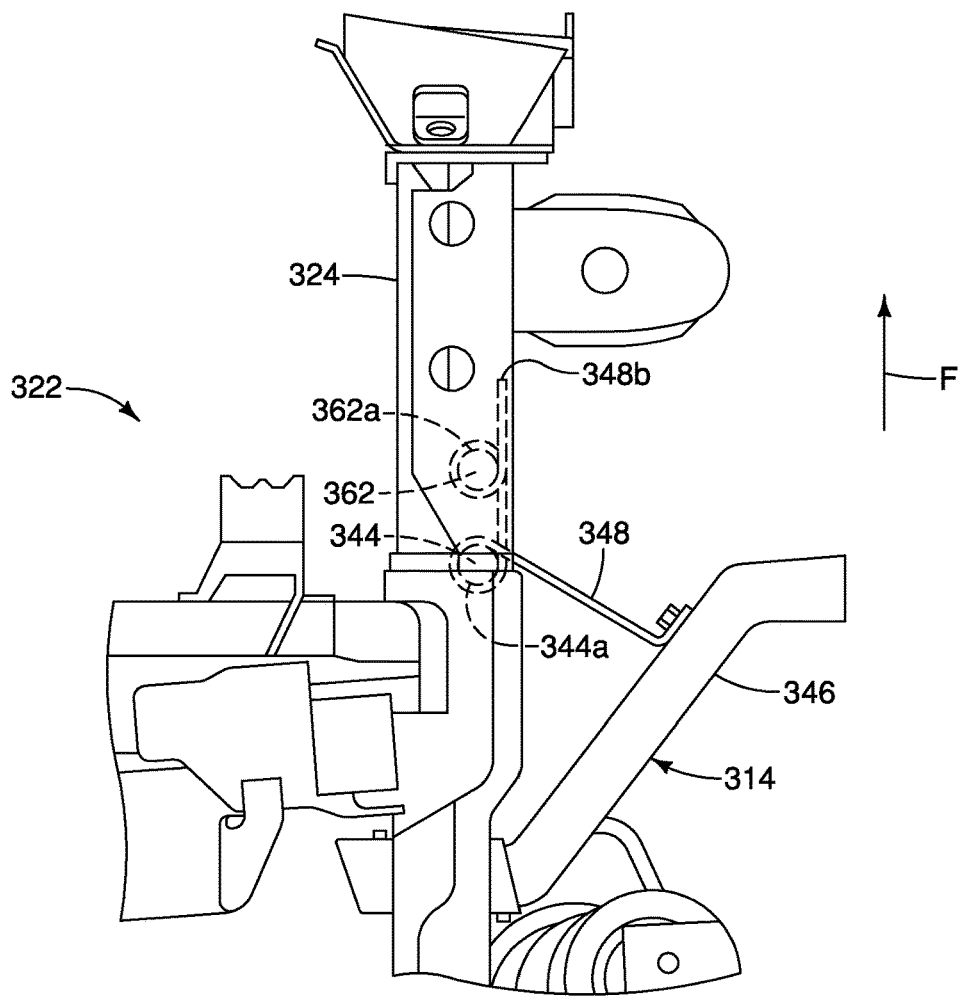
FIG. 12 is a top view of an energy absorbing structure in accordance with another exemplary embodiment of the present invention in which the energy absorbing structure includes a plurality of fixed members.

As shown in FIG. 12, a vehicle frame 322 in accordance with another illustrated exemplary embodiment of the present invention is substantially similar to the vehicle frame 22 of the exemplary embodiment illustrated in FIGS. 1 to 9 except for the differences described below. Similar parts are identified with similar reference numerals, except increased by 300 (i.e., 3xx, accordingly).

The energy absorbing structure 314, as shown in FIG. 12, has a first fixed member 344 and a second fixed member 362. The second fixed member 362 is disposed forward of the first fixed member 344 and forward of the impact structure 346. The connecting member 348 is movably connected to the first and second fixed members 344 and 362.

The connecting member 348 of the energy absorbing structure 314 has a first contact angle with the outer surface 344a of the first fixed member 344 of approximately 360 degrees and a second contact angle with the outer surface 362a of the second fixed member of approximately 360 degrees. The second end 348b of the connecting member 348 is disposed forward of the second fixing member 344 and forward of the impact structure 346. The second end 348b of the connecting member 348 is disposed within the first structural member 324.

By providing a longer path for the connecting member 348 prior to being straightened between the first fixed member 344 and the impact member 346, a larger amount of energy can be absorbed by the energy absorbing structure 314. A longer path is provided by the configuration shown in FIG. 12 by providing a contact angle of approximately 360 degrees with the second fixed member 362 and a contact angle of approximately 360 degrees with the first fixed member 344.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle frame equipped with the energy absorbing structure. Accordingly, these terms, as utilized to describe the present invention should be interpreted relative to a vehicle frame equipped with the energy absorbing structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle frame comprising:
   a first structural member extending in a vehicle longitudinal direction; and
   an energy absorbing structure connected to the first structural member, the energy absorbing structure including
      a first fixed member connected to the first structural member;
      an impact member welded to the first structural member, the impact member extending from an outboard side of the first structural member; and
      a connecting member movably connected to the first fixed member and having a first end fixed to the impact member such that movement of the impact member moves the connecting member about the first fixed member.

2. The vehicle frame accordingly to claim 1, wherein a second end of the connecting member is free.

3. The vehicle frame accordingly to claim 1, wherein the first fixed member is disposed within the first structural member.

4. The vehicle frame accordingly to claim 3, wherein
a window is disposed in the first structural member, and
the first end of the connecting member extends from the window.

5. The vehicle frame accordingly to claim 1, wherein
the impact member and the first structural member are made of the same material.

6. The vehicle frame accordingly to claim 1, wherein
the connecting member is made of a spring steel.

7. The vehicle frame accordingly to claim 1, wherein
the impact member has a first portion, a second portion and a third portion, the first and third portions being substantially parallel to each other, and the second portion extending angularly between the first and third portions.

8. A vehicle frame comprising:
a first structural member extending in a vehicle longitudinal direction; and
an energy absorbing structure connected to the first structural member, the energy absorbing structure including
a first fixed member connected to the first structural member;
an impact member connected to the first structural member; and
a connecting member movably connected to the first fixed member and having a first end fixed to the impact member such that movement of the impact member moves the connecting member about the first fixed member,
the first fixed member being a spool having a circular cross section when viewed parallel to a longitudinal axis thereof.

9. The vehicle frame accordingly to claim 8, wherein
a contact angle between the connecting member and the first fixed member is less than 180 degrees.

10. The vehicle frame accordingly to claim 9, wherein
the free end of the connecting member is disposed rearward of the first fixed member.

11. The vehicle frame accordingly to claim 1, wherein
a contact angle between the connecting member and the first fixed member is at least 360 degrees, and
the free end of the connecting member is disposed forward of the first fixed member.

12. The vehicle frame accordingly to claim 8, wherein
a contact angle between the connecting member and the first fixed member is at least 720 degrees.

13. The vehicle frame accordingly to claim 1, wherein
a second fixed member is connected to the first structural member, and
the connecting member is movably connected to the first and second fixed members.

14. The vehicle frame accordingly to claim 13, wherein
a first contact angle between the connecting member and the first fixed member is at least 360 degrees, and
a second contact angle between the connecting member and the second fixed member is at least 360 degrees.

15. The vehicle frame accordingly to claim 13, wherein
a second structural member connected to the first structural member and extending in a vehicle lateral direction, and
the impact member is disposed rearwardly of the second structural member.

16. A vehicle frame comprising:
a structural member extending in a vehicle longitudinal direction, the structural member having a window; and
an energy absorbing structure connected to the structural member, the energy absorbing structure including
a fixed member disposed in the structural member;
an impact member connected to the structural member and extending from an outboard side of the structural member; and
a connecting member movably connected to the fixed member and having a first end passing through the window and fixed to the impact member such that movement of the impact member moves the connecting member about the fixed member.

17. The vehicle frame accordingly to claim 16, wherein
a second end of the connecting member is free and disposed within the structural member.

18. The vehicle frame accordingly to claim 16, wherein
a contact angle between the connecting member and the first fixed member is less than 180 degrees.

* * * * *